US012611826B2

(12) United States Patent
    Shirato

(10) Patent No.: US 12,611,826 B2
(45) Date of Patent: Apr. 28, 2026

(54) PNEUMATIC TIRE

(71) Applicant: The Yokohama Rubber Co., LTD.,
               Tokyo (JP)

(72) Inventor: Soichiro Shirato, Kanagawa (JP)

(73) Assignee: The Yokohama Rubber Co., LTD.,
               Tokyo (JP)

( * ) Notice: Subject to any disclaimer, the term of this
              patent is extended or adjusted under 35
              U.S.C. 154(b) by 224 days.

(21) Appl. No.: 18/001,815

(22) PCT Filed: May 25, 2021

(86) PCT No.: PCT/JP2021/019803
     § 371 (c)(1),
     (2) Date: Dec. 14, 2022

(87) PCT Pub. No.: WO2021/256191
     PCT Pub. Date: Dec. 23, 2021

(65) Prior Publication Data
     US 2023/0219310 A1     Jul. 13, 2023

(30) Foreign Application Priority Data
     Jun. 19, 2020     (JP) ................................ 2020-106037

(51) Int. Cl.
     *B60C 19/12*          (2006.01)
     *B29C 73/16*          (2006.01)
(52) U.S. Cl.
     CPC .......... *B29C 73/163* (2013.01); *B60C 19/122*
                                                   (2013.01)

(58) Field of Classification Search
     CPC .............................. B60C 19/12; B60C 19/122
     See application file for complete search history.

(56) References Cited

U.S. PATENT DOCUMENTS

| | | | |
|---|---|---|---|
| 3,981,342 A * | 9/1976 | Farber ................ | B29D 30/0685 |
| | | | 106/33 |
| 5,295,525 A * | 3/1994 | Sanda, Jr. ............. | B60C 1/0008 |
| | | | 152/503 |
| 2003/0230369 A1* | 12/2003 | Domer .................. | B60C 19/122 |
| | | | 156/115 |

FOREIGN PATENT DOCUMENTS

| | | | | |
|---|---|---|---|---|
| CN | 101580000 A | 11/2009 | | |
| EP | 1859967 A1 * | 11/2007 | ............... | C08K 5/14 |
| JP | 53-16203 A | 2/1978 | | |
| JP | 2006-152110 A | 6/2006 | | |
| JP | 2016-108540 A | 6/2016 | | |

(Continued)

OTHER PUBLICATIONS

Machine Translation: WO-2019181415-A1, Kiyohito T, (Year: 2025).*

*Primary Examiner* — Kendra Ly

(74) *Attorney, Agent, or Firm* — Thorpe North & Western

(57) ABSTRACT

In the pneumatic tire including a sealant layer containing an adhesive sealant on an inner surface of a tread portion, when a thickness of the sealant layer at 0° C. is $G_0$, a thickness of the sealant layer at 50° C. is $G_{50}$, a width of the sealant layer at 0° C. is $W_0$, and a width of the sealant layer at 50° C. is $W_{50}$, a rate of change $R_G$ of thickness expressed by $R_G = (|G_{50}-G_0|/G_0) \times 100$ is set to 3% or less, and a rate of change $R_W$ of width expressed by $R_W = (|W_{50}-W_0|/W_0) \times 100$ is set to 3% or less.

11 Claims, 2 Drawing Sheets

(56) References Cited

FOREIGN PATENT DOCUMENTS

| JP | 2016-152110 A | 8/2016 | |
|----|---------------|--------|---|
| WO | 2017/179576 A1 | 10/2017 | |
| WO | WO-2019181415 A1 * | 9/2019 | ........... B29C 73/163 |

* cited by examiner

PNEUMATIC TIRE

TECHNICAL FIELD

The present technology relates to a self-sealing type pneumatic tire including a sealant layer on a tire inner surface.

BACKGROUND ART

In a known pneumatic tire, a sealant layer is provided on an inner side in a tire radial direction of an innerliner layer in a tread portion (for example, see Japan Unexamined Patent Publication No. 2006-152110 A). In such a pneumatic tire, when a foreign matter such as a nail sticks into the tread portion, a sealant constituting the sealant layer flows into a through-hole made by the foreign matter, and accordingly, a decrease in air pressure can be suppressed and travel can be maintained.

In the self-sealing type pneumatic tire described above, when the viscosity of the sealant is lower, since the sealant easily flows into the through-hole, improvement of sealing properties can be expected, but in a case where the sealant flows toward a tire center side due to the effects of heat and centrifugal force applied during travel, and as a result, the through-hole deviates from a tire center region, there is concern that the sealant becomes insufficient and sealing properties cannot be obtained sufficiently. On the other hand, when the sealant has a high viscosity, a flow of the sealant described above can be prevented, but the sealant becomes difficult to flow into the through-hole, and there is concern that the sealing properties decrease. Thus, when a sealant layer is provided on a tire inner surface, there is a demand for the pneumatic tire to suppressing of a flow of a sealant associated with travel and ensure good sealing properties in a well-balanced, compatible manner.

Additionally, the dimension of the sealant tends to vary depending on the temperature because, typically, the sealant mainly contains rubber. That is, the sealant tends to expand at high temperatures and shrink at low temperatures. Furthermore, the viscosity of the sealant is also temperature dependent, and thus the fluidity tends to vary depending on the temperature. That is, when the viscosity of the sealant decreases at high temperatures, the thickness or width of the sealant layer may be changed due to the flow of the sealant. Due to such change in dimension of the sealant layer, for example, when the thickness of the sealant layer is decreased, an adequate amount of the sealant is less likely to flow into the through-hole, and when the width of the sealant layer is decreased, a range in which the sealing properties can be exhibited may become narrower. Since tires may be used in various environments (e.g., cold region, high temperature region, region with a large diurnal range, and region with a large annual temperature range) and a large temperature change may occur based on the travel speed, when a sealant layer is provided in a tire, it is demanded that a dimension change of the sealant layer (sealant) due to the temperature change should be suppressed and good sealing properties should be exhibited regardless of temperature conditions.

SUMMARY

The present technology provides a pneumatic tire including a sealant layer on a tire inner surface and being capable of exhibiting good sealing properties regardless of temperature conditions.

The pneumatic tire according to an embodiment of the present technology that achieves the object described above includes a tread portion extending in a tire circumferential direction and having an annular shape, a pair of sidewall portions disposed on both sides of the tread portion, and a pair of bead portions disposed on an inner side in a tire radial direction of the sidewall portions, a sealant layer containing an adhesive sealant being provided at least on an inner surface of the tread portion, when a thickness of the sealant layer at 0° C. is $G_0$, a thickness of the sealant layer at 50° C. is $G_{50}$, a width of the sealant layer at 0° C. is $W_0$, and a width of the sealant layer at 50° C. is $W_{50}$, a rate of change $R_G$ of thickness expressed by Equation (1) below being 3% or less, and a rate of change $R_W$ of width expressed by Equation (2) below being 3% or less.

$$R_G = (|G_{50}-G_0|/G_0) \times 100 \tag{1}$$

$$R_W = (|W_{50}-W_0|/W_0) \times 100 \tag{2}$$

The pneumatic tire of an embodiment of the present technology exhibits sealing properties by the sealant layer provided as described above and, at this time, since the rate of change $R_G$ of thickness and the rate of change $R_W$ of width are set adequately low as described above, a dimension change is less likely to occur even when a temperature change occurred, and excellent sealing properties can be exhibited regardless of temperature conditions.

Note that "rate of change $R_G$ of thickness" is calculated by Equation (1) above and specifically determined by the following method. That is, at each of positions at which the tire inner circumference is divided into twelve equal parts, three positions that are located at 10 mm inner side in the tire width direction from both edges of the sealant layer and the tire equatorial position are used as measurement points. At each of the measurement points, a needle with a diameter of 0.5 mm is pierced perpendicularly in the sealant layer, and when the tip of the needle reaches the interface between sealant layer and the tire inner surface, the position of the needle corresponding to the surface of the sealant layer (face in the tire cavity side) is marked. The length between the tip of the needle removed from the sealant layer to the mark (thickness of the sealant layer) is measured. "Thickness $G_0$ of the sealant layer at 0° C." and "thickness $G_{50}$ of the sealant layer at 50° C." are measured after the surrounding temperature around the tire is set to each temperature condition (0° C. or 50° C.) and the tire is allowed to stand still for 1 hour. The difference between $G_0$ and $G_{50}$ ($|G_{50}-G_0|$) is determined for each measurement point, and the value at a measurement point having the largest difference is taken as "rate of change R G of thickness". Similarly, "rate of change $R_W$ of width" is calculated by Equation (2) above and specifically determined by the following method. That is, each of positions at which the tire inner circumference is divided into twelve equal parts is used as a measurement point. At each of the measurement points, a length along a tire width direction between the edges of the sealant layer (width of the sealant layer) is measured. "Width $W_0$ of the sealant layer at 0° C." and "width $W_{50}$ of the sealant layer at 50° C." are measured after the surrounding temperature around the tire is set to each temperature condition (0° C. or 50° C.) and the tire is allowed to stand still for 1 hour. The difference between $W_0$ and $W_{50}$ ($|W_{50}-W_0|$) is determined for each measurement point, and the value at a measurement point having the largest difference is taken as "rate of change $R_W$ of width".

In an embodiment of the present technology, a ratio $\eta_0/\eta_{50}$ of a viscosity $\eta_0$ (in kPa·s) of the adhesive sealant at 0° C. to a viscosity $\eta_{50}$ (in kPa·s) of the adhesive sealant at 50° C. is preferably 6 or less. Setting the viscosities in such ranges is advantageous for improving the sealing properties. In particular, since the viscosity change associated with a temperature change is adequately small, excellent sealing properties can be exhibited regardless of temperature conditions. Note that the viscosity of the adhesive sealant is a value measured in accordance with JIS (Japanese Industrial Standard) K 6833-1:2008 by using a rotational viscometer at a specified temperature condition (0° C., 50° C.).

In an embodiment of the present technology, the adhesive sealant is preferably crosslinked. As described above, forming the sealant layer with an adhesive sealant that is crosslinked in advance is advantageous for preventing deformation of the sealant layer in the tire width direction and the tire circumferential direction.

In an embodiment of the present technology, in the adhesive sealant, the proportion A of the toluene insoluble component expressed by Equation (3) below is preferably from 30 mass % to 60 mass %. Since the adhesive sealant having such physical properties has a crosslinking density in an adequate range and has such a physical property that a dimension change associated with a temperature change is small, the adhesive sealant is advantageous for exhibiting excellent sealing properties regardless of temperature conditions.

$$A=(M2/M1)\times100 \tag{3}$$

In the equation, M2 is a mass (in g) of a toluene insoluble component remained after the adhesive sealant is immersed in toluene and allowed to stand still for one week, and M1 is an initial mass (in g) before the adhesive sealant is immersed in toluene.

In an embodiment of the present technology, the adhesive sealant contains a crosslinking agent, and the crosslinking agent preferably contains a sulfur component. Accordingly, good adhesiveness of the adhesive sealant to the tire inner surface is achieved, and this is advantageous for preventing deformation of the sealant layer in the tire width direction and the tire circumferential direction (a flow of the adhesive sealant).

In an embodiment of the present technology, the rubber component constituting the adhesive sealant preferably contains a butyl rubber. By blending the butyl rubber as described above, adhesiveness of the adhesive sealant to the tire inner surface can be improved, which is advantageous for ensuring good sealing properties.

In an embodiment of the present technology, an auxiliary sheet that covers a surface of the sealant layer is preferably provided. When the auxiliary sheet is provided as described above, deformation of the sealant layer is limited by the auxiliary sheet, and thus it is advantageous for suppressing deformation and a flow of the sealant layer. Attachment of foreign matters on the surface of the sealant layer can be also prevented.

Note that, in the description below, dimensions of a tire are measured with the tire mounted on a regular rim, inflated to a regular internal pressure, and loaded with a regular load. "Regular rim" refers to a rim defined by a standard for each tire according to a system of standards that includes standards with which tires comply, and is "standard rim" defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO), for example. In the system of standards, including standards with which tires comply, "regular internal pressure" is air pressure defined by each of the standards for each tire and refers to "maximum air pressure" in the case of JATMA, the maximum value being listed in the table "TIRE LOAD LIMITS AT VARIOUS COLD INFLATION PRESSURES" in the case of TRA, or "INFLATION PRESSURE" in the case of ETRTO. However, "regular internal pressure" is 180 kPa in a case where a tire is for a passenger vehicle. "Regular load" is a load defined by a standard for each tire according to a system of standards that includes standards with which tires comply, and refers to a "maximum load capacity" in the case of JATMA, the maximum value being listed in the table of "TIRE LOAD LIMITS AT VARIOUS COLD INFLATION PRESSURES" in the case of TRA, or "LOAD CAPACITY" in the case of ETRTO. "Regular load" corresponds to 88% of the loads described above in a case where a tire is for a passenger vehicle.

DETAILED DESCRIPTION

Configurations of embodiments of the present technology will be described in detail below with reference to the accompanying drawings.

Figure 1:
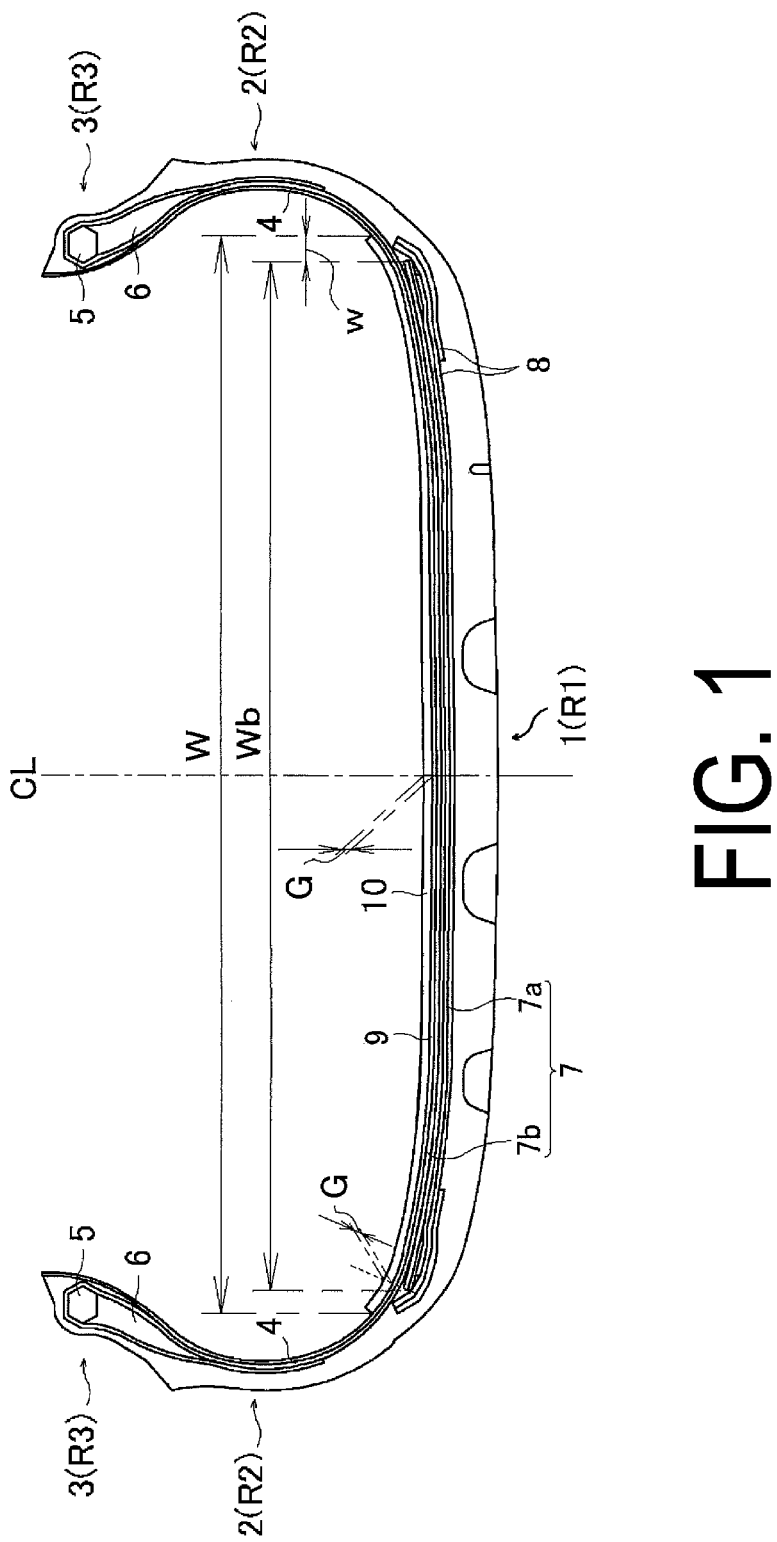
FIG. 1 is a meridian cross-sectional view illustrating an example of a pneumatic tire of an embodiment of the present technology.

As illustrated in FIG. 1 for example, a pneumatic tire (self-sealing type pneumatic tire) of an embodiment of the present technology includes a tread portion 1 extending in a tire circumferential direction and having an annular shape, a pair of sidewall portions 2 disposed on both sides of the tread portion 1, and a pair of bead portions 3 disposed on an inner side in a tire radial direction of the sidewall portions 2. Note that "CL" in FIG. 1 denotes a tire equator. Note that FIG. 1 is a meridian cross-sectional view, and although not illustrated, the tread portion 1, the sidewall portions 2, and the bead portions 3 each extend in the tire circumferential direction and each have an annular shape, and accordingly, a basic structure of a toroidal shape of the pneumatic tire is formed. Other tire components in the meridian cross-sectional view also extend in the tire circumferential direction to form annular shapes unless otherwise indicated.

In the example of FIG. 1, a carcass layer 4 is mounted between the pair of bead portions 3 of left and right. The carcass layer 4 includes a plurality of reinforcing cords extending in the tire radial direction, and is folded back around a bead core 5 and a bead filler 6 disposed in each of the bead portions 3 from a vehicle inner side to a vehicle outer side. Additionally, the bead filler 6 is disposed on an outer circumferential side of the bead core 5, and the bead filler 6 is enveloped by a body portion and a folded back portion of the carcass layer 4.

A plurality of belt layers 7 (two layers in FIG. 1) are embedded on an outer circumferential side of the carcass layer 4 in the tread portion 1. Among the plurality of belt layers 7, a layer having the smallest belt width is referred to as a minimum belt layer 7a, and a layer having the largest belt width is referred to as a maximum belt layer 7b. The belt layers 7 each include a plurality of reinforcing cords inclining with respect to the tire circumferential direction, and are disposed such that the reinforcing cords of the different layers intersect each other. In these belt layers 7, the inclination angle of the reinforcing cords with respect to the tire circumferential direction is set in a range of, for example, 10° or more and 400 or less. A belt reinforcing layer 8 is provided on an outer circumferential side of the belt layers 7 in the tread portion 1. In the illustrated example, the belt reinforcing layer 8 is provided including two layers of a full cover layer covering the entire width of the belt layer 7 and an edge cover layer disposed further on an outer circumferential side than the full cover layer and covering only an end portion of the belt layer 7. The belt reinforcing layer 8 includes an organic fiber cord oriented in the tire circumferential direction, and an angle of the organic fiber cord with respect to the tire circumferential direction is set to be, for example, from 0° to 5°.

In the tread portion 1, a tread rubber layer R1 is disposed on the outer circumferential side of the above-mentioned tire constituent members (the carcass layer 4, the belt layer 7, and the belt reinforcing layer 8). The tread rubber layer R1 may have a structure in which two types of rubber layers (a cap tread layer and an undertread layer) with differing physical properties are layered in the tire radial direction. A side rubber layer R2 is disposed on the outer circumferential side (the outer side in the tire width direction) of the carcass layer 4 in the sidewall portion 2, and a rim cushion rubber layer R3 is disposed on the outer circumferential side (the outer side in the tire width direction) of the carcass layer 4 in the bead portion 3.

On a tire inner surface, an innerliner layer 9 is provided along the carcass layer 4. Innerliner layer 9 is a layer for preventing air in the tire from permeate outside the tire. The innerliner layer 9 includes, for example, a rubber composition including, as a main component, butyl rubber having air permeation preventing performance. Alternatively, the innerliner 9 can also include a resin layer including a thermoplastic resin as a matrix. In the case of the resin layer, a resin layer including an elastomer component dispersed in a matrix of a thermoplastic resin may be used.

An embodiment of the present technology relates to a sealant layer 10 described below provided on an inner surface of such a pneumatic tire. Thus, as long as the pneumatic tire of an embodiment of the present technology includes the sealant layer 10 described below, the basic structure is not limited to the structure described above. Note that the sealant layer 10 is adhered to the inner surface of the pneumatic tire having the basic structure described above.

Specifically, the sealant layer 10 is provided on the tire inner surface corresponding to a region into which a foreign matter such as a nail may stick during travel, that is, a ground contact region of the tread portion 1 (inner side in the tire radial direction of the innerliner layer 9). By the sealant layer 10, when a foreign matter such as a nail sticks into the tread portion 1, a sealant constituting the sealant layer 10 flows into a through-hole created by the foreign matter and seals the through-hole, and accordingly, a decrease in air pressure can be suppressed and travel can be maintained.

For the sealant layer 10 of an embodiment of the present technology, when the thickness at 0° C. is $G_0$ and the thickness at 50° C. is $G_{50}$, the sealant layer 10 of an embodiment of the present technology has a rate of change $R_G$ of thickness expressed by Equation (1) below of 3% or less, and preferably 2% or less. Note that $G_0$ and $G_{50}$ have measurement positions that are common, though measurement temperatures are different. In the drawings, thickness G is used as a sign to represent both $G_0$ and $G_{50}$. Since the rate of change $R_G$ of thickness is set adequately low as described above, a dimension change (change in thickness) is less likely to occur even when a temperature change occurs, an adequate amount of the sealant that flows into the through-hole can be ensured regardless of temperature conditions, and excellent sealing properties can be exhibited.

$$R_G=(|G_{50}-G_0|/G_0)\times100 \qquad (1)$$

Here, when the rate of change $R_G$ of thickness is more than 3%, an adequate amount of the sealant that flows into the through-hole cannot be ensured when the thickness of the sealant layer 10 becomes smaller, and good sealing properties cannot be maintained. The thickness of the sealant layer 10 is not particularly limited. In a typical pneumatic tire, the thickness G of the sealant layer 10 is preferably, for example, from 0.5 mm to 5.0 mm. Note that the thickness of the sealant layer 10 described here is a thickness at room temperature (25° C.), which is different from those for $G_0$ and $G_{50}$ described above. The sealant layer 10 has this degree of thickness, and accordingly, a flow of a sealant during travel can be suppressed while ensuring good sealing properties. Additionally, good processability at the time of attaching the sealant layer 10 to the tire inner surface is also obtained. When the thickness of the sealant layer 10 is less than 0.5 mm, it becomes difficult to ensure sufficient sealing properties. When the thickness of the sealant layer 10 exceeds 5.0 mm, tire weight increases and rolling resistance degrades.

Furthermore, for the thickness of the sealant layer 10, when the thickness at −30° C. is $G_{-30}$ and the thickness at 80° C. is $G_{50}$, the sealant layer 10 of an embodiment of the present technology preferably has a rate of change $R_G'$ of thickness expressed by Equation (1') below of preferably 3% or less, and more preferably 2.5% or less. When the rate of change $R_G'$ of thickness is set adequately low as described above, a dimension change (change in thickness) is less likely to occur even when a significant temperature change occurs, an adequate amount of the sealant that flows into the through-hole can be ensured regardless of temperature conditions, and better sealing properties can be exhibited. Note that $G_{-30}$, $G_{50}$, and $R_G'$ can be determined by the method identical to or similar to that for $G_0$, $G_{50}$, and $R_G$ by changing only the temperature condition.

$$R_G'=(|G_{80}-G_{-30}|/G_{-30})\times100 \qquad (1')$$

Similarly, for the sealant layer 10 of an embodiment of the present technology, when the width at 0° C. is $W_0$ and the width at 50° C. is $W_{50}$, the sealant layer 10 of an embodiment of the present technology has a rate of change $R_W$ of width expressed by Equation (2) below of 3% or less, and preferably 2% or less. Note that $W_0$ and $W_{50}$ have measurement positions that are common, though measurement temperatures are different. In the drawings, width W is used as a sign to represent both $W_0$ and $W_{50}$. Since the rate of change $R_W$ of width is set adequately low as described above, a dimension change (change in width) is less likely to occur even when a temperature change occurs, an adequate region where sealing properties are exhibited can be ensured regardless of temperature conditions, and excellent sealing properties can be exhibited.

$$R_W=(|W_{50}-W_0|/W_0)\times100 \qquad (2)$$

Here, when the rate of change $R_W$ of width is more than 3%, an adequate region covered by the sealant layer 10 (region where sealing properties can be exhibited) cannot be ensured when the width of the sealant layer 10 becomes smaller, and good sealing properties cannot be maintained. The width of the sealant layer 10 is not particularly limited. In a typical pneumatic tire, the width of the sealant layer 10 is preferably not less than a width Wb (width of a belt layer having a largest width (in the case of the illustrated example, the largest belt layer 7b)) of the belt layer 7. Furthermore, a protruded amount w of the sealant layer 10 based on a normal line to the carcass line passing through the edge in the width direction of the belt layer having a largest width (in the case of the illustrated example, the largest belt layer 7b) is preferably 20 mm or less. Note that the width and the protruded amount w of the sealant layer 10 described here are dimensions at room temperature (25° C.), which are different from those for $W_0$ and $W_{50}$ described above.

Furthermore, for the width of the sealant layer 10, when the width at −30° C. is $W_{-30}$ and the width at 80° C. is $W_{50}$, the sealant layer 10 of an embodiment of the present technology preferably has a rate of change $R_{W'}$ of width expressed by Equation (2') below of preferably 3% or less, and more preferably 2.5% or less. When the rate of change $R_{W'}$ of width is set adequately low as described above, a dimension change (change in width) is less likely to occur even when a significant temperature change occurs, an adequate amount of the sealant that flows into the through-hole can be ensured regardless of temperature conditions, and better sealing properties can be exhibited. Note that $W_{-30}$, $W_{50}$, and $R_{W'}$ can be determined by the method identical to or similar to that for $W_0$, $W_{50}$, and $R_W$ by changing only the temperature condition.

$$R_{W'}=(|W_{80}-W_{-30}|/W_{-30})\times100 \qquad (2')$$

The sealant layer 10 can be formed by attaching later an adhesive sealant (hereinafter, simply referred to as "sealant") to the inner surface of the vulcanized pneumatic tire. For example, the sealant layer 10 can be formed by attaching a sealant formed in a sheet shape to the entire circumference of the tire inner surface, or by spirally attaching a sealant formed in a string-like shape or a band-like shape to the tire inner surface. Here, a crosslinked sealant is preferably used. When the sealant that is crosslinked in advance is used as described above, deformation of the sealant in the tire width direction and the tire circumferential direction can be effectively prevented.

Figure 2:
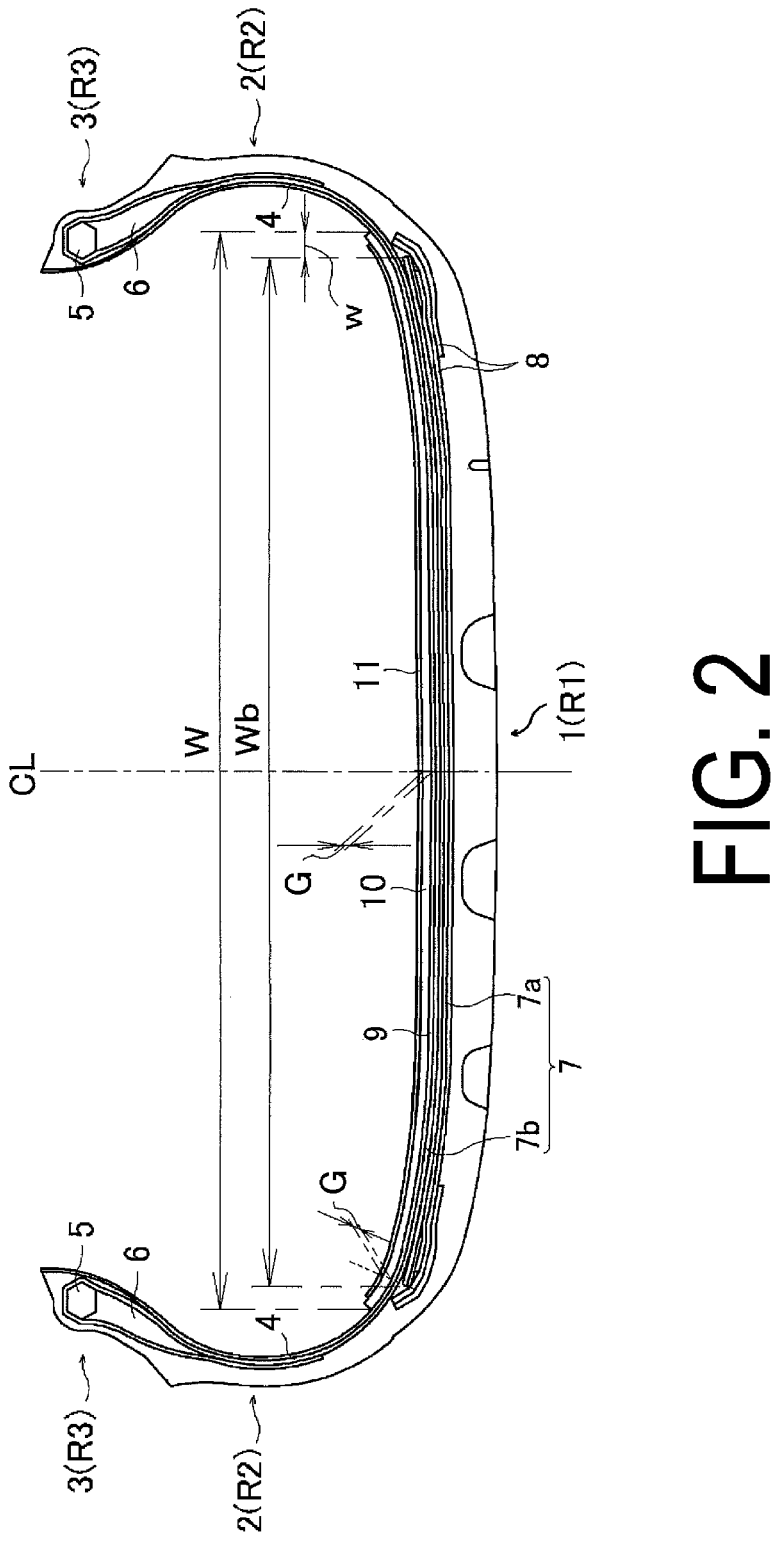
FIG. 2 is a meridian cross-sectional view illustrating another example of a pneumatic tire of an embodiment of the present technology.

From the perspective of suppressing deformation of the sealant layer 10, as illustrated in FIG. 2, an auxiliary sheet 11 covering a surface of the sealant layer 10 may further be provided on a surface (face that is exposed to the tire cavity) of the sealant layer 10. FIG. 2 has a structure that is common with that in FIG. 1 except for the auxiliary sheet 11. Presence of such an auxiliary sheet 11 is advantageous for preventing deformation of the sealant layer in the tire width direction and the tire circumferential direction because the deformation of the sealant layer 10 (a flow of the sealant) is regulated. Furthermore, by providing the auxiliary sheet 11, attachment of the foreign matters on a surface of the sealant layer 10 can be also prevented. The material of the auxiliary sheet 11 is not particularly limited, and a resin film of polyethylene, polyamide, and the like can be suitably used. The auxiliary sheet 11 is to mainly suppress deformation of the sealant layer 10 as described above, does not need to be a sheet covering the entire surface of the sealant layer 10 and, for example, may be a material partially having a hole or missing portion, such as a material in a mesh form or a net form. Furthermore, even in a case where the auxiliary sheet 11 is in a sheet form that does not have holes or missing portions, the auxiliary sheet 11 does not need to cover the entire surface of the sealant layer 10 and preferably covers at least 80%, and preferably 90% or more, of the surface area (area of a face exposed to the tire cavity) of the sealant layer 10.

In an embodiment of the present technology, as the sealant, a material that is typically used for the sealant layer 10 of a self-sealing type pneumatic tire can be used. However, from the perspective of suppressing deformation of the sealant layer 10 associated with a temperature change, a material having a ratio $\eta_0/\eta_{50}$ of a viscosity $\eta_0$ at 0° C. (in kPa·s) to a viscosity $\eta_0$ at 50° C. (in kPa·s) of preferably 6 or less, and more preferably 4 or less, is preferably used. Using a sealant having such physical properties is advantageous for improving sealing properties. In particular, since the viscosity change associated with a temperature change is small, excellent sealing properties can be exhibited regardless of temperature conditions. Here, when the ratio $\eta_0/\eta_{50}$ of the viscosities is more than 6, processability of the sealant may be deteriorated. The viscosity $\eta_0$ and the viscosity $\eta_{50}$ are not particularly limited, and from the perspective of basic performance of the sealant (characteristics by which flow is less likely to occur during travel while good sealing properties is ensured), the viscosity $\eta_0$ is preferably set to, for example, from 2 kPa·s to 100 kPa·s.

Furthermore, for the viscosity of the sealant, when the viscosity at −30° C. is $\eta_{-30}$ (in kPa·s) and the viscosity at 80° C. is $\eta_{80}$ (in kPa·s), a ratio $\eta_{-30}/\eta_{80}$ is preferably 18 or less, and more preferably 12 or less. Furthermore, the viscosity so is preferably set to, for example, from 0.5 kPa·s to 30 kPa·s. By setting the viscosity as described above, the viscosity change associated with a significant temperature change is made adequately small, excellent sealing properties can be exhibited regardless of temperature conditions. Note that the viscosities $\eta_{-30}$ and $\eta_{80}$ can be determined by the method identical to or similar to that for the viscosities $\eta_0$ and $\eta_{50}$ by changing only the temperature condition.

Furthermore, in the sealant used in an embodiment of the present technology, a proportion A of toluene insoluble component expressed by Equation (3) below is from 30 mass % to 60 mass %, and preferably from 35 mass % to 50 mass %.

$$A=(M2/M1)\times100 \qquad (3)$$

In the equation, M2 is a mass (in g) of a toluene insoluble component remained after the sealant is immersed in toluene and allowed to stand still for one week, and M1 is an initial mass (in g) before the sealant is immersed in toluene.

The sealant having such characteristics is effective to exhibit excellent sealing properties regardless of temperature conditions. Specifically, by setting the proportion A of the toluene insoluble component to 30 mass % to 60 mass %, good crosslinking density can be achieved, thus physical properties by which the dimension change associated with a temperature change is small can be imparted, and excellent sealing properties can be exhibited regardless of temperature conditions. When the proportion A of the toluene insoluble component is less than 30 mass %, crosslinking density becomes low, and the effect of suppressing the dimension change associated with a temperature change cannot be sufficiently achieved. When the proportion A of the toluene insoluble component exceeds 60 mass %, crosslinking density becomes excessively high, and there is concern that sealing properties decrease.

As long as the sealant used in an embodiment of the present technology has the characteristics described above, a specific composition thereof is not particularly limited. However, to ensure the characteristics described above, the sealant used in an embodiment of the present technology is preferably formed of, for example, a sealant composition having the following composition.

In the sealant composition constituting the sealant according to an embodiment of the present technology (hereinafter, referred to as "sealant composition of an embodiment of the present technology"), a rubber component may include a butyl rubber. A proportion of the butyl rubber occupying the rubber component is preferably 10 mass % or more, and more preferably from 20 mass % to 90 mass %. Good adhesiveness with respect to the tire inner surface can be ensured by including the butyl rubber in this manner. When the proportion of the butyl rubber is less than 10 mass %, adhesiveness with respect to the tire inner surface cannot be ensured sufficiently.

The sealant composition of an embodiment of the present technology preferably includes, as the butyl rubber, halogenated butyl rubber. Examples of the halogenated butyl rubber include chlorinated butyl rubber and brominated butyl rubber, and particularly, chlorinated butyl rubber can be used suitably. In a case where chlorinated butyl rubber is used, a proportion of the chlorinated butyl rubber occupying 100 mass % of the rubber component is preferably 5 mass % or more, and more preferably from 10 mass % to 85 mass %. Reactivity of the rubber component and a crosslinking agent or an organic peroxide described below increases by including the halogenated butyl rubber (chlorinated butyl rubber), and this is advantageous in that ensuring of sealing properties and suppression of a flow of the sealant are provided in a compatible manner. Additionally, the processability of the sealant composition can also improve. When the proportion of the chlorinated butyl rubber is less than 5 mass %, reactivity of the rubber component and the crosslinking agent or the organic peroxide described below does not improve sufficiently, and a desired effect cannot be obtained sufficiently.

In the sealant composition of an embodiment of the present technology, not all the butyl rubber is required to be the halogenated butyl rubber (chlorinated butyl rubber), and non-halogenated butyl rubber can also be used in combination. Examples of the non-halogenated butyl rubber include unmodified butyl rubber normally used in a sealant composition, such as BUTYL-065 available from JSR Corporation, and BUTYL-301 available from LANXESS AG. In a case where the halogenated butyl rubber and the non-halogenated butyl rubber are used in combination, a blended amount of the non-halogenated butyl rubber may be preferably less than 20 mass %, and more preferably less than 10 mass % per 100 mass % of the rubber component.

In the sealant composition of an embodiment of the present technology, two or more types of rubber are preferably used in combination as the butyl rubber. That is, other type of halogenated butyl rubber (for example, brominated butyl rubber) or the non-halogenated butyl rubber is preferably used in combination with respect to the chlorinated butyl rubber. The three types of the chlorinated butyl rubber, other type of halogenated butyl rubber (brominated butyl rubber), and the non-halogenated butyl rubber mutually differ in a vulcanization rate, and thus, when at least the two types are used in combination, the physical properties (viscosity, elasticity, and the like) of the sealant composition obtained after vulcanization do not become uniform due to a difference in the vulcanization rate. That is, due to a distribution (variation in concentration) of rubber differing in a vulcanization rate in the sealant composition, a relatively hard portion and a relatively soft portion are mixed in the sealant layer obtained after vulcanization. As a result, this is advantageous in that fluidity is suppressed in the relatively hard portion and sealing properties are exhibited in the relatively soft portion, and thus such performance is provided in a well-balanced, compatible manner.

In the sealant composition of an embodiment of the present technology, other diene rubber than the butyl rubber can also be blended as the rubber component. As other diene rubber, rubber that is generally used in a sealant composition, such as natural rubber (NR), isoprene rubber (IR), butadiene rubber (BR), styrene butadiene rubber (SBR), styrene isoprene butadiene rubber (SIBR), ethylene propylene diene rubber (EPDM), chloroprene rubber (CR), and acrylonitrile butadiene rubber (NBR) can be used. Other diene rubber may be used alone or as a discretionary blend.

In the sealant composition of an embodiment of the present technology, a crosslinking agent is preferably blended. Note that "crosslinking agent" in an embodiment of the present technology refers to a crosslinking agent excluding an organic peroxide, and examples of the crosslinking agent include sulfur, flowers of zinc, cyclic sulfide, a resin (resin vulcanization), and amine (amine vulcanization). As the crosslinking agent, a crosslinking agent including a sulfur component (for example, sulfur) is preferably used. The crosslinking agent is blended in this manner, and accordingly, adequate crosslinking for providing ensuring of sealing properties and prevention of a flow of the sealant in a compatible manner can be realized. A blended amount of the crosslinking agent is preferably from 0.1 parts by mass to 40 parts by mass, and more preferably from 0.5 parts by mass to 20 parts by mass per 100 parts by mass of the rubber component described above. When the blended amount of the crosslinking agent is less than 0.1 parts by mass, the blended amount of the crosslinking agent is identical to a blended amount in the case of including substantially no crosslinking agent, and appropriate crosslinking cannot be performed. When the blended amount of the crosslinking agent exceeds 40 parts by mass, crosslinking of the sealant composition excessively proceeds, and sealing properties decrease.

In the sealant composition of an embodiment of the present technology, the crosslinking agent described above is not used alone, but is preferably used in combination with an organic peroxide. The crosslinking agent and the organic peroxide are used in combination and are blended in this manner, and accordingly, adequate crosslinking for providing ensuring of sealing properties and prevention of a flow of the sealant in a compatible manner can be realized. A blended amount of the organic peroxide is preferably from 1 part by mass to 40 parts by mass, and more preferably from 1.0 part by mass to 20 parts by mass per 100 parts by mass of the rubber component described above. When the blended amount of the organic peroxide is less than 1 part by mass, the blended amount of the organic peroxide is excessively small, and crosslinking cannot be performed sufficiently, and desired physical properties cannot be obtained. When the blended amount of the organic peroxide exceeds 40 parts by mass, crosslinking of the sealant composition excessively proceeds, and sealing properties decrease.

When the crosslinking agent and the organic peroxide are used in combination in this manner, a mass ratio A/B of a blended amount A of the crosslinking agent to a blended amount B of the organic peroxide may be preferably from 5/1 to 1/200, and more preferably from 1/10 to 1/20. According to such a blending proportion, ensuring of sealing properties and prevention of a flow of the sealant can be provided in a better-balanced, compatible manner.

Examples of the organic peroxide include dicumyl peroxide, t-butyl cumyl peroxide, benzoyl peroxide, dibenzoyl peroxide, butyl hydroperoxide, p-chlorobenzoyl peroxide, and 1,1,3,3-tetramethylbutyl hydroperoxide. Particularly, an organic peroxide having a one-minute half-life temperature of from 100° C. to 200° C. is preferable, and among the specific examples described above, dicumyl peroxide and t-butyl cumyl peroxide are particularly preferable. Note that in an embodiment of the present technology, as "one-minute half-life temperature," generally, a value described in the "Organic Peroxide Catalog No. 10 Ed." from Nippon Oil & Fats Co., Ltd. is employed, and in a case where a value is not described, a value determined from thermal decomposition in an organic solvent by a method identical to a method described in the catalog is employed.

In the sealant composition of an embodiment of the present technology, a crosslinking aid is preferably blended. Crosslinking aid refers to a compound that acts as a cross-linking reaction catalyst by blending the compound with the crosslinking agent including the sulfur component. The crosslinking agent and the crosslinking aid are blended, and accordingly, the vulcanization rate can be increased, and the productivity of the sealant composition can be enhanced. A blended amount of the crosslinking aid is preferably more than 0 parts by mass and less than 1 part by mass, and more preferably from 0.1 parts by mass to 0.9 parts by mass per 100 parts by mass of the rubber component described above. The blended amount of the crosslinking aid is reduced in this manner, and accordingly, degradation (heat degradation) of the sealant composition can be suppressed while promoting crosslinking reaction as a catalyst. When the blended amount of the crosslinking aid is 1 part by mass or more, the effect of suppressing heat degradation cannot be obtained sufficiently. Note that crosslinking aid is a crosslinking aid that acts as a crosslinking reaction catalyst by blending the crosslinking aid with the crosslinking agent including the sulfur component as described above, and thus, when the crosslinking aid coexists with an organic peroxide instead of the sulfur component, the effect as a crosslinking reaction catalyst cannot be obtained, and a large content of the crosslinking aid needs to be used, and heat degradation is promoted.

The blended amount of the crosslinking agent may be preferably from 50 mass % to 400 mass %, and more preferably from 100 mass % to 200 mass % of the blended amount of the crosslinking aid described above. The cross-linking agent and the crosslinking aid are blended in this manner and in a well-balanced manner, and accordingly, a good function of the crosslinking aid as a catalyst can be exhibited, and this is advantageous in that ensuring of sealing properties and prevention of a flow of the sealant are provided in a compatible manner. When the blended amount of the crosslinking agent is less than 50 mass % of the blended amount of the crosslinking aid, fluidity decreases. When the blended amount of the crosslinking agent exceeds 400 mass % of the blended amount of the crosslinking aid, deterioration resistance performance decreases.

Examples of the crosslinking aid include sulfenamide-based, thiazole-based, thiuram-based, thiourea-based, gua-nidine-based, dithiocarbamate-based, aldehyde-amine-based, aldehyde-ammonia-based, imidazoline-based, and xanthogen-based compounds (vulcanization accelerators). Among these, thiazole-based, thiuram-based, guanidine-based, and dithiocarbamate-based vulcanization accelerators can be used suitably. Examples of the thiazole-based vulcanization accelerator include 2-mercaptobenzothiazole, and dibenzothiazyl disulfide. Examples of the thiuram-based vulcanization accelerator include tetramethylthiuram mono-sulfide, and tetramethylthiuram disulfide. Examples of the guanidine-based vulcanization accelerator include diphenylguanidine, and di-ortho-tolylguanidine. Examples of the dithiocarbamate-based vulcanization accelerator include sodium dimethyldithiocarbamate, and sodium diethyldithio-carbamate. Particularly, in an embodiment of the present technology, thiazole-based or thiuram-based vulcanization accelerators are preferably used, and variation in the per-formance of the sealant composition obtained can be sup-pressed.

Note that, for example, a compound such as quinone dioximethat actually functions as the crosslinking agent may be referred to as the crosslinking aid for the sake of convenience, but crosslinking aid in an embodiment of the present technology is a compound functioning as a catalyst of crosslinking reaction using the crosslinking agent as described above, and thus, the quinone dioxime does not correspond to the crosslinking aid in an embodiment of the present technology.

The sealant composition of an embodiment of the present technology is preferably blended with a liquid polymer. The liquid polymer is blended in this manner, and accordingly, the viscosity of the sealant composition can be enhanced, and sealing properties can improve. A blended amount of the liquid polymer is preferably from 50 parts by mass to 400 parts by mass, and more preferably from 70 parts by mass to 200 parts by mass per 100 parts by mass of the rubber component described above. When the blended amount of the liquid polymer is less than 50 parts by mass, the effect of enhancing the viscosity of the sealant composition cannot be obtained sufficiently. When the blended amount of the liquid polymer exceeds 400 parts by mass, a flow of the sealant cannot be prevented sufficiently.

The liquid polymer is preferably co-crosslinkable with the rubber component (butyl rubber) in the sealant composition, and examples of the liquid polymer include paraffin oil, polybutene oil, polyisoprene oil, polybutadiene oil, poly-isobutene oil, aroma oil, and polypropylene glycol. From the perspective of reducing the temperature dependency of the physical properties of the sealant composition and ensuring good sealing properties in low-temperature environments, among these, paraffin oil, polybutene oil, polyisoprene oil, polybutadiene oil, aroma oil, and polypropylene glycol are preferable, and particularly, paraffin oil is preferably used. Paraffin oil is used, and accordingly, this is advantageous in that viscosity at each of the temperatures described above is set to be in each of the appropriate ranges. Additionally, molecular weight of the liquid polymer is preferably 800 or more, more preferably 1000 or more, and even more pref-erably 1200 or more and 3000 or less. The liquid polymer having large molecular weight is used in this manner, and accordingly, a shift of an oil component from the sealant layer provided on the tire inner surface to a tire main body to affect the tire can be prevented.

An embodiment of the present technology will further be described below by way of Examples, but the scope of an embodiment of the present technology is not limited to Examples.

EXAMPLES

Tires of Comparative Examples 1 and 2 and Examples 1 to 8 were produced, each of the tires having a tire size of 235/40R18 and a basic structure illustrated in FIG. 1 or FIG. 2, including a sealant layer on an inner surface of a tread portion, and having a rate of change $R_G$ of thickness, the rate of change $R_G{}'$ of thickness, the rate of change $R_W$ of width, the rate of change $R_{W'}$ of width, the viscosity $\eta_{-30}$, the viscosity $\eta_0$, the viscosity $\eta_{50}$, the viscosity $\eta_{80}$, the ratio $\eta_0/\eta_{50}$, the ratio $\eta_{-30}/\eta_{80}$, the proportion A of a toluene insoluble component, presence of an auxiliary sheet, and the proportion of area of the auxiliary sheet with respect to the surface area of the sealant layer set as listed in Table 1.

The rate of change $R_G$ of thickness was calculated by Equation (1) below based on the thickness $G_0$ of the sealant layer at 0° C. and the thickness $G_{50}$ of the sealant layer at 50° C. Specifically, at each of positions at which the tire inner circumference was divided into twelve equal parts, three positions that were located at 10 mm inner side in the tire width direction from both edges of the sealant layer and the tire equatorial position were used as measurement points. At each of the measurement points, a needle with a diameter of 0.5 mm was pierced perpendicularly in the sealant layer, and when the tip of the needle reached the interface between the sealant layer and the tire inner surface, the position of the needle corresponding to the surface of the sealant layer (face in the tire cavity side) was marked. The length between the tip of the needle removed from the sealant layer to the mark (thickness of the sealant layer) was measured. "Thickness $G_0$ of the sealant layer at 0° C." and "thickness $G_{50}$ of the sealant layer at 50° C." were measured after the surrounding temperature around the tire was set to each temperature condition (0° C. or 50° C.) and the tire was allowed to stand still for 1 hour. The difference between $G_0$ and $G_{50}$ ($|G_{50}-G_0|$) was determined for each measurement point, and the value at a measurement point having the largest difference was taken as "rate of change $R_G$ of thickness".

$$R_G=(|G_{50}-G_0|/G_0)\times100 \qquad (1)$$

The rate of change $R_G'$ of thickness was calculated by Equation (1') below based on the thickness $G_{-30}$ of the sealant layer at –30° C. and the thickness $G_{50}$ of the sealant layer at 80° C. The measurement conditions are common with those for the rate of change $R_G$ of thickness described above except for temperature conditions.

$$R_G'=(|G_{80}-G_{-30}|/G_{-30})\times100 \qquad (1')$$

The rate of change $R_W$ of width was calculated by Equation (2) below based on the width $W_0$ of the sealant layer at 0° C. and the width $W_{50}$ of the sealant layer at 50° C. Specifically, each of positions at which the tire inner circumference was divided into twelve equal parts was used as a measurement point. At each of the measurement points, a length along a tire width direction between the edges of the sealant layer (width of the sealant layer) was measured. "Width $W_0$ of the sealant layer at 0° C." and "width $W_{50}$ of the sealant layer at 50° C." were measured after the surrounding temperature around the tire was set to each temperature condition (0° C. or 50° C.) and the tire was allowed to stand still for 1 hour. The difference between $W_0$ and $W_{50}$ ($|W_{50}-W_0|$) was determined for each measurement point, and the value at a measurement point having the largest difference was taken as "rate of change $R_W$ of width".

$$R_W=(|W_{50}-W_0|/W_0)\times100 \qquad (2)$$

The rate of change $R_{W'}$ of width was calculated by Equation (2') below based on the width $W_{-30}$ of the sealant layer at –30° C. and the width $W_{50}$ of the sealant layer at 80° C. The measurement conditions are common with those for the rate of change $R_W$ of width described above except for temperature conditions.

$$R_{W'}=(|W_{50}-W_{-30}|/W_{-30})\times100 \qquad (2')$$

The viscosity $\eta_{-30}$ was the viscosity of the sealant at –30° C., the viscosity $\eta_0$ was the viscosity of the sealant at 0° C., the viscosity $\eta_{50}$ was the viscosity of the sealant at 50° C., and the viscosity $\eta_{80}$ was the viscosity of the sealant at 80° C., and each of the viscosities was measured in accordance with JIS K 6833-1:2008 at each temperature condition by using a rotational viscometer.

The proportion A (mass %) of the toluene insoluble component was calculated by the following Equation (3) based on the mass M2 (in g) of the toluene insoluble component remained after the sealant was immersed in toluene and allowed to stand still for one week, and the initial mass M1 (in g) before the sealant was immersed in toluene.

$$A=(M2/M1)\times100 \qquad (3)$$

In all examples, the width of the belt layer was 195 mm, the width of the sealant layer (width at 25° C.) was 215 mm (110% of the width of the belt layer), and the thickness of the sealant layer was 3 mm (thickness at 25° C.).

For these test tires, extrusion speed, processability, and sealing properties were evaluated by the following test methods, and the results are collectively shown in Table 1.

Sealing Properties

After each of the test tires was allowed to stand still at the temperature condition described below for 24 hours, the test tire was mounted on a wheel having a rim size of 18×8.5 J, and the wheel was mounted on a test vehicle. At an initial air pressure of 250 kPa and a load of 8.5 kN, a nail having a diameter of 4.0 mm was inserted into the tread portion. Then, after the tire was allowed to stand still at the temperature condition described below for one hour in a state in which the nail was removed, the air pressure was measured. As the temperature conditions, four conditions, at –30° C., 0° C., 50° C., and 80° C., were employed, and the test was performed at each of the temperature conditions. Note that the temperature condition at which the nail was inserted was identical to the condition at which the tire was allowed to stand still before and after the nail was inserted. The evaluation results are indicated by the following four levels. Note that the evaluation result of "3" or "4" means exhibition of adequate sealing properties, and the case of "4" means exhibition of particularly excellent sealing properties.

4: Air pressure obtained after the standing was 240 kPa or more and 250 kPa or less 3: Air pressure obtained after the standing was 230 kPa or more and less than 240 kPa 2: Air pressure obtained after the standing was 200 kPa or more and less than 230 kPa 1: Air pressure obtained after the standing is less than 200 kPa Fluidity of sealant The test tires were mounted on wheels having a rim size of 18×8.5 J, and mounted on a drum testing machine, and at an air pressure of 220 kPa, a load of 8.5 kN, and a travel speed of 150 km/h, travel for one hour was performed, and a flow state of the sealant after the travel was examined. In the evaluation results, lines of 20×40 squares each having a grid width of 5 mm were ruled in a surface of the sealant layer before the travel, and the number of the squares having a distorted shape after the travel was counted, and then, the case where no flow of the sealant was observed (the number of the distorted squares was 0) was indicated as "3", the case where the number of the distorted squares was less than ¼ of the total number of the squares was indicated as "2", and the case where the number of the distorted squares was ¼ or more of the total number of the squares was indicated as "1".

TABLE 1-1

| | | Comparative Example 1 | Comparative Example 2 | Example 1 | Example 2 | Example 3 |
|---|---|---|---|---|---|---|
| Rate of change $R_G$ of thickness | % | 8.2 | 7.3 | 2.8 | 2.6 | 1.1 |
| Rate of change $R_G'$ of thickness | % | 7.4 | 6.5 | 2.9 | 2.4 | 1.3 |
| Rate of change $R_W$ of width | % | 11.2 | 8.6 | 3.4 | 2.9 | 1.4 |
| Rate of change $R_W'$ of width | % | 9.8 | 7.8 | 3.8 | 2.7 | 1.6 |
| Viscosity $\eta_{-30}$ | kPa · s | 63 | 42 | 26 | 16 | 18 |
| $\eta_0$ | kPa · s | 32 | 21 | 8 | 10 | 12 |
| $\eta_{50}$ | kPa · s | 4 | 3 | 6 | 5 | 4 |
| $\eta_{80}$ | kPa · s | 2.5 | 2 | 5 | 2 | 2 |
| Ratio $\eta_0/\eta_{50}$ | | 8.0 | 7.0 | 1.3 | 2.0 | 3.0 |
| Ratio $\eta_{-30}/\eta_{80}$ | | 25.2 | 21.0 | 5.2 | 8.0 | 9.0 |
| Proportion A of toluene insoluble component | Mass % | 18 | 26 | 31 | 45 | 52 |
| Presence of auxiliary sheet | | Yes | Yes | Yes | Yes | Yes |
| Proportion of area of auxiliary sheet | % | 75 | 82 | 81 | 88 | 98 |
| Sealing properties 50° C. | | 1 | 1 | 3 | 3 | 4 |
| 0° C. | | 1 | 1 | 3 | 3 | 4 |
| 80° C. | | 1 | 1 | 2 | 3 | 4 |
| −30° C. | | 1 | 1 | 2 | 3 | 4 |
| Fluidity of sealant | | 1 | 1 | 3 | 3 | 3 |

TABLE 1-2

| | | Example 4 | Example 5 | Example 6 | Example 7 | Example 8 |
|---|---|---|---|---|---|---|
| Rate of change $R_G$ of thickness | % | 2.0 | 2.8 | 2.6 | 1.1 | 2.0 |
| Rate of change $R_G'$ of thickness | % | 2.2 | 2.3 | 2.4 | 1.3 | 2.2 |
| Rate of change $R_W$ of width | % | 2.3 | 3.1 | 2.9 | 1.4 | 2.3 |
| Rate of change $R_W'$ of width | % | 2.4 | 3.4 | 2.7 | 1.6 | 2.4 |
| Viscosity $\eta_{-30}$ | kPa · s | 30 | 32 | 16 | 18 | 30 |
| $\eta_0$ | kPa · s | 16 | 17 | 10 | 12 | 16 |
| $\eta_{50}$ | kPa · s | 4 | 3 | 5 | 4 | 4 |
| $\eta_{80}$ | kPa · s | 3 | 2 | 2 | 2 | 3 |
| Ratio $\eta_0/\eta_{50}$ | | 4.0 | 5.7 | 2.0 | 3.0 | 4.0 |
| Ratio $\eta_{-30}/\eta_{80}$ | | 10.0 | 16.0 | 8.0 | 9.0 | 10.0 |
| Proportion A of toluene insoluble component | Mass % | 48 | 33 | 45 | 52 | 48 |
| Presence of auxiliary sheet | | Yes | Yes | No | No | No |
| Proportion of area of auxiliary sheet | % | 83 | 83 | — | — | — |
| Sealing properties 50° C. | | 3 | 3 | 3 | 4 | 3 |
| 0° C. | | 3 | 3 | 3 | 4 | 3 |
| 80° C. | | 3 | 2 | 3 | 4 | 3 |
| −30° C. | | 3 | 2 | 3 | 4 | 3 |
| Fluidity of sealant | | 3 | 3 | 2 | 2 | 2 |

As can be seen from Table 1, the pneumatic tires of Examples 1 to 8 each exhibited excellent sealing properties regardless of temperature conditions. Furthermore, the pneumatic tires of Examples 1 to 8 each had good fluidity, and the flow of the sealant was suppressed after the travel. In particular, in the tires of Examples 1 to 5 each having the auxiliary sheet, the flow of the sealant was not observed at all, and the fluidity was particularly excellent. On the other hand, since Comparative Examples 1 and 2 had large rate of change $R_G$ of thickness and rate of change $R_W$ of width, adequate sealing properties and fluidity could not be ensured.

The invention claimed is:

1. A pneumatic tire comprising: a tread portion extending in a tire circumferential direction and having an annular shape, a pair of sidewall portions disposed on both sides of the tread portion, and a pair of bead portions disposed on an inner side in a tire radial direction of the sidewall portions, a sealant layer containing an adhesive sealant being provided at least on an inner surface of the tread portion and an auxiliary sheet only partially covering a surface of the sealant layer, when a thickness of the sealant layer at 0° C. is $G_0$, a thickness of the sealant layer at 50° C. is $G_{50}$, a width of the sealant layer at 0° C. is $W_0$, and a width of the sealant layer at 50° C. is $W_{50}$, a rate of change $R_G$ of thickness expressed by Equation (1) being 3% or less, and a rate of change $R_W$ of width expressed by Equation (2) being 3% or less:

$$R_G=(|G_{50}-G_0|/G_0)\times100 \tag{1}$$

$$R_W=(|W_{50}-W_0|/W_0)\times100 \tag{2}; \text{wherein}$$

the auxiliary sheet and the adhesive sealant collectively forming an innermost surface on a tire cavity side of the pneumatic tire at all points along a width and a circumference of the tire where the adhesive sealant is provided, the adhesive sealant contains a crosslinking agent, an organic peroxide and a crosslinking aid, and the crosslinking agent contains a sulfur component, a mass ratio A/B of a blended amount A of the crosslinking agent to a blended amount B of the organic peroxide is in a range of 2.5/1 to 5/1, and a blended amount of the crosslinking aid is from 0.1 parts by mass to 0.9 parts by mass per 100 parts by mass of a rubber component included in the adhesive sealant.

2. The pneumatic tire according to claim 1, wherein the adhesive sealant is crosslinked.

3. The pneumatic tire according to claim 1, wherein, in the adhesive sealant, a proportion A of a toluene insoluble component expressed by Equation (3) is from 30 mass % to 60 mass %:

$$A=(M2/M1)\times100 \tag{3}$$

where M2 is a mass (in g) of a toluene insoluble component remained after the adhesive sealant is immersed in toluene and allowed to stand still for one week, and M1 is an initial mass (in g) before the adhesive sealant is immersed in toluene.

4. The pneumatic tire according to claim 1, wherein a rubber component constituting the adhesive sealant contains a butyl rubber.

5. The pneumatic tire according to claim 1, further comprising an innerliner layer, the sealant layer being provided on a radially inner side of the innerliner layer at the tread portion.

6. The pneumatic tire according to claim 1, wherein the auxiliary sheet has a mesh form or a net form.

7. The pneumatic tire according to claim 1, wherein the auxiliary sheet covers at least 80% of a surface area of the adhesive sealant.

8. The pneumatic tire according to claim 1, wherein a ratio $\eta_0/\eta_{50}$ of a viscosity $\eta_0$ (in kPa·s) of the adhesive sealant at 0° C. to a viscosity $\eta_{50}$ (in kPa·s) of the adhesive sealant at 50° C. is 6.0 or less.

9. The pneumatic tire according to claim 8, wherein the adhesive sealant is crosslinked.

10. The pneumatic tire according to claim 9, wherein, in the adhesive sealant, a proportion A of a toluene insoluble component expressed by Equation (3) is from 30 mass % to 60 mass %:

$$A=(M2/M1)\times100 \tag{3}$$

where M2 is a mass (in g) of a toluene insoluble component remained after the adhesive sealant is immersed in toluene and allowed to stand still for one week, and M1 is an initial mass (in g) before the adhesive sealant is immersed in toluene.

11. The pneumatic tire according to claim 10, wherein a rubber component constituting the adhesive sealant contains a butyl rubber.

* * * * *